United States Patent [19]

Thissen

[11] Patent Number: 5,443,725
[45] Date of Patent: Aug. 22, 1995

[54] CONTINUOUSLY OPERATING FILTERING DEVICE

[75] Inventor: Karel A. Thissen, Utrecht, Netherlands

[73] Assignee: Pannevis B.V., Netherlands

[21] Appl. No.: 164,053

[22] Filed: Dec. 8, 1993

[30] Foreign Application Priority Data

Dec. 9, 1992 [NL] Netherlands ............ 9202132

[51] Int. Cl.⁶ .................. B01D 33/04; B01D 33/056
[52] U.S. Cl. ............................ 210/401; 210/406
[58] Field of Search ............... 210/400, 401, 406

[56] References Cited

FOREIGN PATENT DOCUMENTS

| 0033371 | 8/1981 | European Pat. Off. ..... B01D 33/00 |
| 0080665 | 6/1985 | European Pat. Off. ..... B29F 3/00 |
| 1265024 | 5/1961 | France . |
| 3830780 | 4/1990 | Germany ............. B01D 29/09 |
| 2012179 | 7/1979 | United Kingdom ....... B01D 33/04 |
| 2174014 | 10/1986 | United Kingdom ....... B01D 33/04 |

*Primary Examiner*—Neil McCarthy
*Attorney, Agent, or Firm*—Webb Ziesenheim Bruening Logsdon Orkin & Hanson

[57] ABSTRACT

Continuously operating filtering devices are voluminous when accommodated in a casing. The casing serves to maintain a determined pressure around the filter, for instance by use of released gases. It is the ojective of the present invention to keep the volume as small as possible. This is achieved by using plastic material for the carrier belt. Up to the present, rubber carrier belts have been used. These however impose limitations on the diameter of the guide rollers. A limitation of the roller diameter to 25% in comparison to rubber carrier belts is possible with the use of plastic. In addition, plastic has a better resistance to aggressive substances.

20 Claims, 4 Drawing Sheets

CONTINUOUSLY OPERATING FILTERING DEVICE

BACKGROUND OF THE INVENTION

1. FIELD OF THE INVENTION

The invention relates to a continuously operating filtering device comprising a carrier belt movable round guide rollers and at least one drive roller and a filter belt supported thereby and means for supporting the carrier belt.

2. DESCRIPTION OF THE PRIOR ART

Such filtering devices, particularly when they are accommodated in a housing or casing, are voluminous which causes problems at the location of use, for instance in the processing industry.

SUMMARY OF THE INVENTION

It is therefore the object of the invention to limit the size of the device.

This is achieved according to the invention in that the carrier belt is made of plastic.

By choosing a plastic carrier belt, the diameter of the drive roller and guide rollers can be kept considerably smaller than is the case with the usual rubber carrier belt. A limitation to 25% of the roller diameter in the case of rubber carrier belts is possible. It is of further advantage that plastic is generally resistant to aggressive substances, which is not the case with rubber.

In the case of a rubber carrier belt, lubrication has to be applied between the means for supporting the carrier belt and the carrier belt itself, since the coefficient of friction of the rubber material is comparatively high. Lubrication can be dispensed with when plastic is used.

As a result of the lower friction the driving power can likewise be limited.

The plastic can be a thermoplastic plastic. A thermosetting plastic may also be chosen. Thermoserring plastic is relatively stiff material. In order to enable training of the belt round the guide rollers, the belt must be constructed from connected links of limited length. Thermosetting plastic can be applied at high temperatures and is more resistant in a chemical atmosphere to for instance solvents.

The device can be accommodated in a housing and be provided with means for maintaining a desired pressure in the housing.

Such filtering devices can be used when for instance solvents can occur freely through evaporation and these gases must be held in a closed circuit. Due to the lower structure of the invention the total size of the filtering device can be restricted despite accommodation in the housing or casing.

At the beginning and end of the path traversed jointly by the carrier belt and the filter belt sealing means can be applied running in a transverse direction and in a lengthwise direction with respect to the belts.

Further advantages and features of the invention will become apparent from the accompanying claims and figure description.

DESCRIPTION OF THE PREFERRED EMBODIMENT

Figure 1:
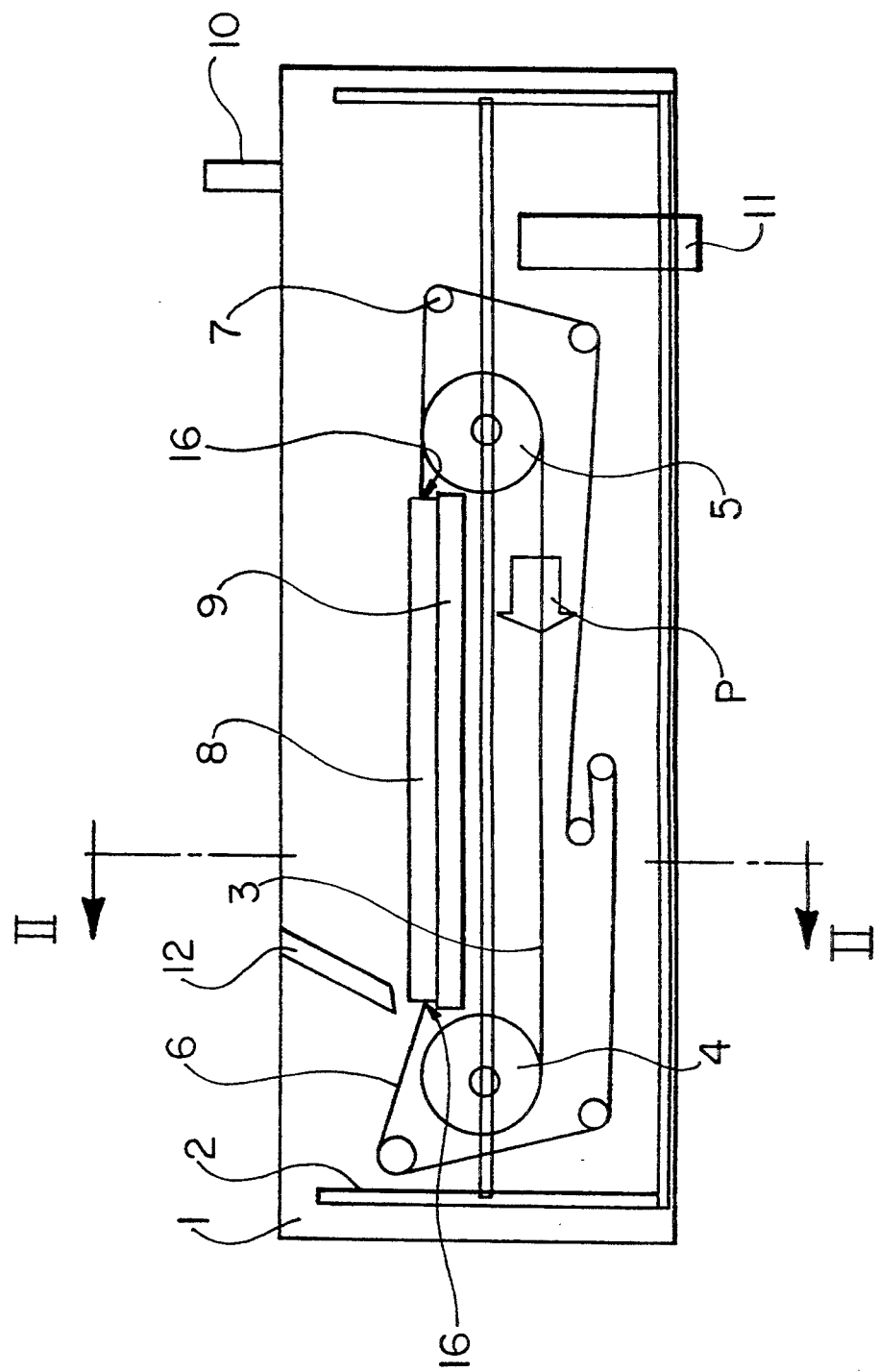
FIG. 1 shows a schematic longitudinal view of a device according to the invention.
Figure 2:
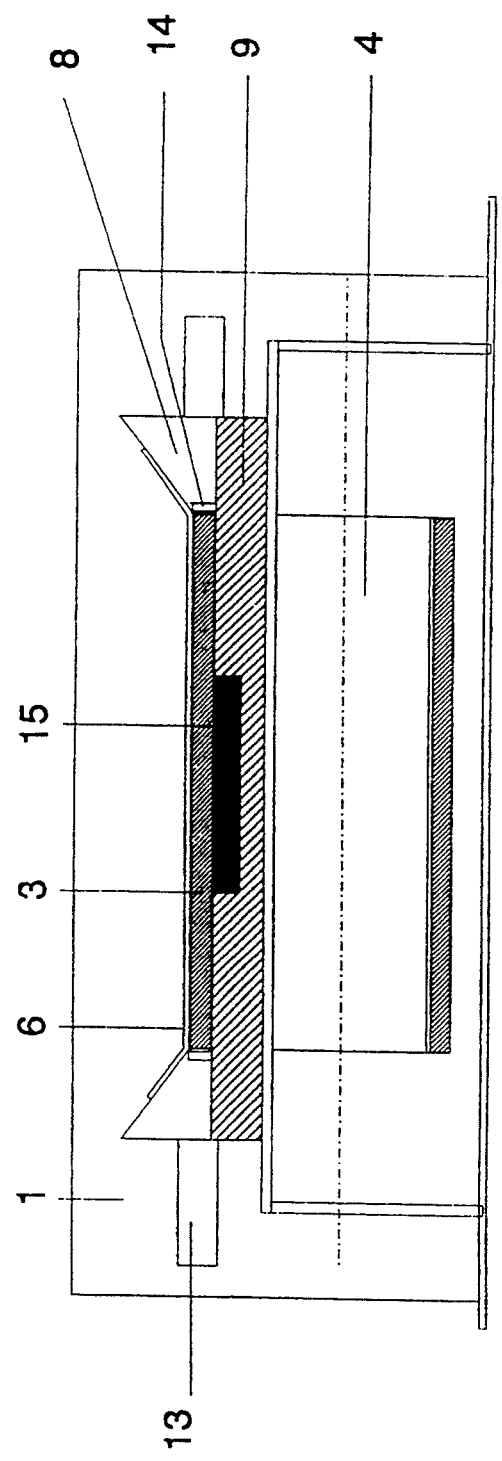
FIG. 2 is a schematic sectional view along the line II—II in FIG. 1.

The device according to the invention is accommodated in a housing 1 inside which a desired pressure is maintained. The device comprises inter alia a frame 2, a carrier belt 3, a reversing roller 4 and a driven roller 5. Carrier belt 3 supports an endless filter belt 6 which is trained round guide rollers, for instance 7. Situated on either side of the filter belt are suction boxes 8. The carrier belt is supported by a support element 9. Using the feed 10 the desired pressure is maintained in housing 1. The filtered material, the filter cake, is carried outside the housing 1 using the outlet 11. The material for filtering is carried into the housing via the feed 12. A connection 13 is arranged on the suction box. At the beginning and end of the path traversed jointly by the carrier belt and the filter belt a seal 16 is arranged in transverse direction and a seal 14 in lengthwise direction.

For a part of the support element 9 a second material 15 with a smaller coefficient of friction that the support element 9 is chosen in order to limit the friction between carrier belt 3 and support element 9.

Operation is possible without lubrication due to the choice of plastic for the carrier belt and the choice of a second material 15 for use with the support element 9.

During operation the belt is rotated in a known manner in the arrow direction P and the material for filtering is carried onto the filter belt 6 over the inlet 12. The filtered material is discharged at the end of the filter belt close to the roller 7.

Figure 3:
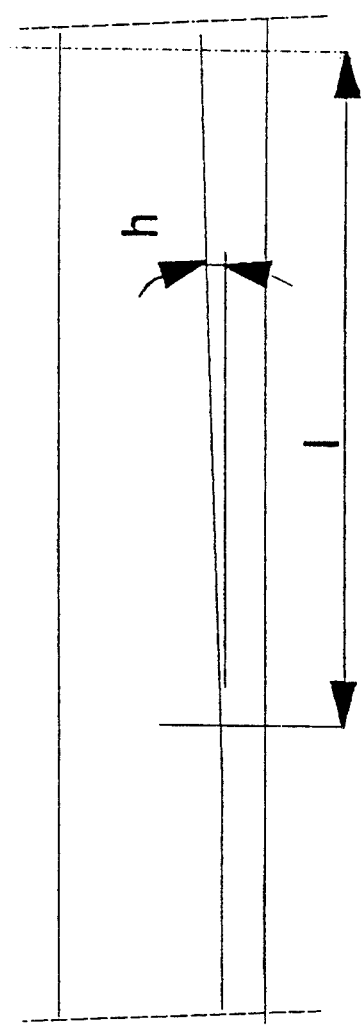
FIGS. 3 and 4 show special features of the applied carrier belt.
Figure 4:
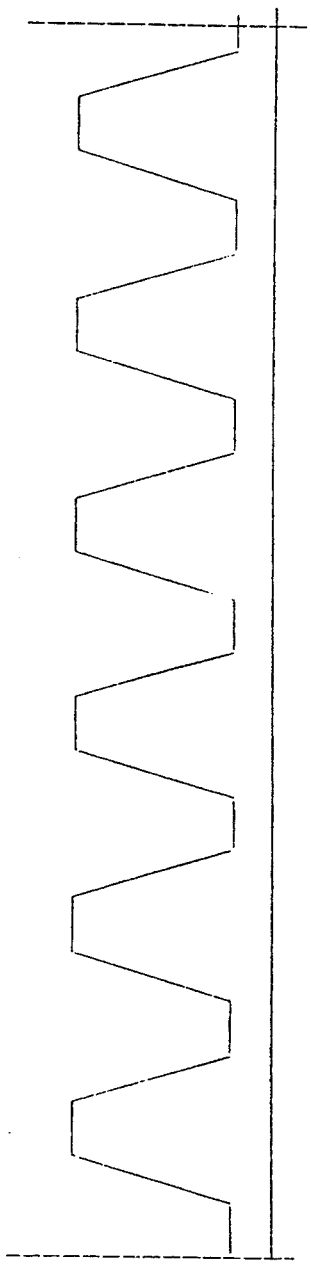

As shown in FIG. 4A the plastic belt is profiled. Due to the chosen profile as according to FIG. 4, a channel is formed with an inclination through an angle H over a length L calculated from the middle of the belt to the side (see FIG. 3). Liquid particles are subjected in this zone to a driving force towards one of the suction boxes as a result of the force of gravity. When compared to a horizontal progression the choice of an inclination has the advantage that, where in the case of a horizontal bottom a liquid particle is loaded equally by both suction boxes, in the present case there is a preferred direction. With a horizontal bottom the discharge characteristic of the channel can be unfavourably affected.

The channel formed by the profile can be interrupted in the center of the belt.

Figure 5:
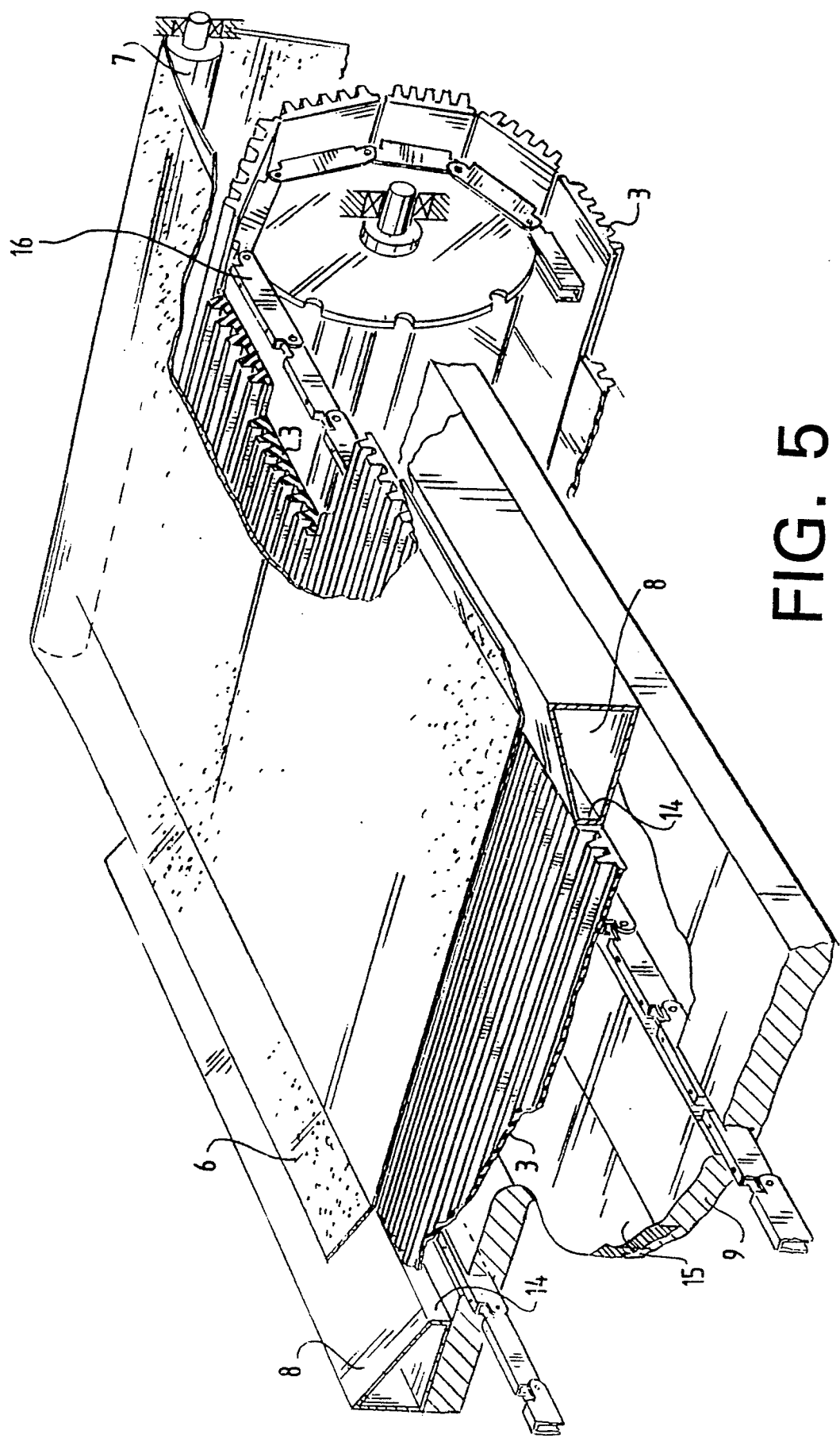
FIG. 5 shows a second embodiment of the device.

In the embodiment of FIG. 5 the carrier belt 3 is constructed from successive links of thermosetting plastic. The links have dimensions of for instance a pitch length of 200 mm and a width of between 500 and 4000 mm. The mutual coupling between the links 16 can be implemented in different ways.

I claim:

1. A continuously operating filtering device comprising a carrier belt having two sides movable round guide rollers and at least one drive roller, a filter belt supported thereby, belt supporting means for supporting the carrier belt, and a suction box disposed on each side of the carrier belt, wherein the carrier belt is made of plastic.

2. The filtering device as claimed in claim 1, wherein the plastic is a thermoplastic.

3. The filtering device as claimed in claim 1, wherein the plastic is a thermosetting plastic and the carrier belt is constructed from a plurality of connected links.

4. The filtering device as claimed in claim 1, wherein the device is accommodated in a housing and is provided with means for maintaining a desired pressure in the housing.

5. The filtering device as claimed in claim 1, wherein the carrier belt has a ribbed profile.

6. The filtering device as claimed in claim 1, further comprising sealing means arranged at a beginning and an end of a path traversed jointly by the carrier belt and the filtering belt and running in transverse direction and in a lengthwise direction of the belts.

7. The filtering device as claimed in claim 1, wherein the belt supporting means is partly made of a material having a coefficient of friction lower than that of the rest of the belt supporting means.

8. The filtering device as claimed in claim 2, wherein the device is accommodated in a housing and is provided with means for maintaining a desired pressure in the housing.

9. The filtering device as claimed in claim 3, wherein the device is accommodated in a housing and is provided with means for maintaining a desired pressure in the housing.

10. The filtering device as claimed in claim 2, wherein the carrier belt has a ribbed profile.

11. The filtering device as claimed in claim 3, wherein the carrier belt has a ribbed profile.

12. The filtering device as claimed in claim 4, wherein the carrier belt has a ribbed profile.

13. The filtering device as claimed in claim 3, further comprising sealing means arranged at a beginning and an end of a path traversed jointly by the carrier belt and the filtering belt and running in transverse direction and in a lengthwise direction of the belts.

14. The filtering device as claimed in claim 4, further comprising sealing means arranged at a beginning and an end of a path traversed jointly by the carrier belt and the filtering belt and running in transverse direction and in a lengthwise direction of the belts.

15. The filtering device as claimed in claim 5, further comprising sealing means arranged at a beginning and an end of a path traversed jointly by the carrier belt and the filtering belt and running in transverse direction and in a lengthwise direction of the belts.

16. The filtering device as claimed in claim 2, wherein the belt supporting means is partly made of a material having a coefficient of friction lower than that of the rest of the belt supporting means.

17. The filtering device as claimed in claim 3, wherein the belt supporting means is partly made of a material having a coefficient of friction lower than that of the rest of the belt supporting means.

18. The filtering device as claimed in claim 4, wherein the belt supporting means is partly made of a material having a coefficient of friction lower than that of the rest of the belt supporting means.

19. The filtering device as claimed in claim 4, wherein the means for maintaining a desired pressure includes a plurality of suction boxes disposed along both sides of the carrier belt.

20. The filtering device as claimed in claim 7, wherein the carrier belt further includes the plurality of spaced apart ridges placed transversely across an upper surface of the carrier belt, wherein said ridges are separated from one another by a transverse channel, and wherein said transverse channel has a negative slope as calculated from a midpoint of said channel to each lateral side of the carrier belt.

* * * * *